(12) United States Patent
Zhang et al.

(10) Patent No.: US 8,913,582 B1
(45) Date of Patent: *Dec. 16, 2014

(54) SYSTEMS AND METHODS FOR SELECTING A MODULATION AND CODING SCHEME FOR WIRELESS COMMUNICATION BETWEEN WIRELESS DEVICES IN A WIRELESS NETWORK

(71) Applicant: Marvell International Ltd., Hamilton (BM)

(72) Inventors: Hongyuan Zhang, Sunnyvale, CA (US); Hui-Ling Lou, Sunnyvale, CA (US); Rohit U. Nabar, Sunnyvale, CA (US); Yong Liu, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/104,168

(22) Filed: Dec. 12, 2013

Related U.S. Application Data

(63) Continuation of application No. 12/716,300, filed on Mar. 3, 2010, now Pat. No. 8,611,288.

(60) Provisional application No. 61/176,083, filed on May 6, 2009, provisional application No. 61/170,778, filed on Apr. 20, 2009, provisional application No. 61/157,591, filed on Mar. 5, 2009.

(51) Int. Cl.
*H04W 4/00* (2009.01)
*H03C 7/02* (2006.01)
*H04B 7/02* (2006.01)
*H04L 1/00* (2006.01)
*H04W 24/02* (2009.01)
*H04B 7/06* (2006.01)

(52) U.S. Cl.
CPC ............ *H04L 1/0003* (2013.01); *H04W 24/02* (2013.01); *H04B 7/0619* (2013.01)
USPC ........... 370/329; 370/267; 370/310; 370/328; 370/341; 370/352; 370/235; 370/319; 370/335; 455/101; 455/103; 455/132; 375/267; 375/299; 375/310; 375/347

(58) Field of Classification Search
CPC .. H04B 7/0619; H04B 1/7174; H04B 7/0697; H04B 7/12; H04J 13/0077; H04J 14/0298; H04L 27/2697; H04L 1/04; H04L 27/2637; H03M 13/3961; H03M 13/41; H03M 13/4107; H03M 13/6511; H03M 13/4184; H03M 13/6325; H03M 13/6362; H03M 13/4161
USPC .......................... 370/228–352; 455/101–132; 375/267–347
See application file for complete search history.

(56) References Cited

U.S. PATENT DOCUMENTS 6,084,919 A * 7/2000 Kleider et al. ................. 375/285
6,167,031 A * 12/2000 Olofsson et al. .............. 370/252

(Continued)

*Primary Examiner* — Venkatesh Haliyur

(57) ABSTRACT

A first wireless device including a receiver and a transmitter. The receiver includes a channel estimation module configured to receive, from a second wireless device over a communication channel, a training packet and estimate a quality of the communication channel based on the training packet, and a modulation and coding scheme (MCS) determination module configured to determine an MCS based on one or more of the training packet and the estimated quality of the communication channel. The transmitter is configured to transmit, to the second wireless device over the communication channel, an indication of the MCS determined by the MCS determination module.

20 Claims, 11 Drawing Sheets

(56) References Cited

U.S. PATENT DOCUMENTS

| | | | |
|---|---|---|---|
| 6,510,174 B1* | 1/2003 | Sexton et al. | 375/213 |
| 6,922,445 B1* | 7/2005 | Sampath et al. | 375/267 |
| 7,046,746 B1* | 5/2006 | Keaney et al. | 375/341 |
| 7,149,239 B2* | 12/2006 | Hudson | 375/144 |
| 7,327,812 B2* | 2/2008 | Auer | 375/347 |
| 7,392,014 B2* | 6/2008 | Baker et al. | 455/67.11 |
| 7,426,249 B2* | 9/2008 | Keaney et al. | 375/341 |
| 7,430,257 B1* | 9/2008 | Shattil | 375/347 |
| 7,433,460 B2* | 10/2008 | Budka et al. | 379/332 |
| 7,474,677 B2* | 1/2009 | Trott | 370/473 |
| 7,515,714 B2* | 4/2009 | Orihashi et al. | 380/255 |
| 7,529,310 B2* | 5/2009 | Auer | 375/267 |
| 7,593,449 B2* | 9/2009 | Shattil | 375/130 |
| 7,599,420 B2* | 10/2009 | Forenza et al. | 375/141 |
| 7,633,994 B2* | 12/2009 | Forenza et al. | 375/141 |
| 7,634,015 B2 | 12/2009 | Waxman | |
| 7,636,381 B2* | 12/2009 | Forenza et al. | 375/141 |
| 7,746,943 B2* | 6/2010 | Yamaura | 375/260 |
| 7,751,372 B2* | 7/2010 | Monsen | 370/335 |
| 7,877,108 B2* | 1/2011 | Wengerter et al. | 455/522 |
| 7,940,740 B2* | 5/2011 | Krishnamurthy et al. | 370/344 |
| 7,948,911 B2* | 5/2011 | Larsson | 370/252 |
| 7,965,618 B2 | 6/2011 | Zhou et al. | |
| 7,965,761 B2* | 6/2011 | Shattil | 375/147 |
| 8,014,267 B2* | 9/2011 | Boer et al. | 370/208 |
| 8,068,845 B2* | 11/2011 | Wengerter et al. | 455/453 |
| 8,072,918 B2 | 12/2011 | Muharemovic et al. | |
| 8,077,667 B2* | 12/2011 | Kuri et al. | 370/329 |
| 8,160,121 B2* | 4/2012 | Forenza et al. | 375/141 |
| 8,165,185 B2* | 4/2012 | Zhang et al. | 375/135 |
| 8,265,566 B2* | 9/2012 | Golitschek | 455/67.7 |
| 8,290,081 B2* | 10/2012 | Le Saux et al. | 375/267 |
| 8,295,395 B2 | 10/2012 | Mueck et al. | |
| 8,311,135 B2 | 11/2012 | Suzuki | |
| 8,379,748 B2 | 2/2013 | Lee et al. | |
| 8,422,439 B2* | 4/2013 | Nimbalker et al. | 370/329 |
| 8,462,611 B2* | 6/2013 | Ma et al. | 370/208 |
| 8,467,331 B2 | 6/2013 | Lakkis | |
| 8,477,813 B2* | 7/2013 | Zhang et al. | 370/510 |
| 8,599,900 B2* | 12/2013 | Zhang et al. | 375/135 |
| 8,611,288 B1* | 12/2013 | Zhang et al. | 370/329 |
| 8,687,717 B2* | 4/2014 | Pare et al. | 375/260 |
| 8,774,251 B2* | 7/2014 | Zhang et al. | 375/135 |
| 2002/0176485 A1* | 11/2002 | Hudson | 375/144 |
| 2003/0043887 A1* | 3/2003 | Hudson | 375/144 |
| 2004/0218567 A1* | 11/2004 | Budka et al. | 370/332 |
| 2005/0047518 A1* | 3/2005 | Auer | 375/267 |
| 2005/0123138 A1* | 6/2005 | Abe et al. | 380/255 |
| 2005/0147025 A1* | 7/2005 | Auer | 370/203 |
| 2006/0176968 A1* | 8/2006 | Keaney et al. | 375/260 |
| 2006/0250973 A1* | 11/2006 | Trott | 370/252 |
| 2006/0251180 A1 | 11/2006 | Baum et al. | |
| 2006/0252386 A1* | 11/2006 | Boer et al. | 455/101 |
| 2007/0060062 A1* | 3/2007 | Wengerter et al. | 455/63.2 |
| 2007/0147251 A1* | 6/2007 | Monsen | 370/235 |
| 2007/0189211 A1 | 8/2007 | Awad et al. | |
| 2007/0189212 A1 | 8/2007 | Awad et al. | |
| 2007/0211786 A1* | 9/2007 | Shattil | 375/141 |
| 2007/0258541 A1* | 11/2007 | Yamaura | 375/267 |
| 2007/0298742 A1 | 12/2007 | Ketchum et al. | |
| 2008/0043709 A1 | 2/2008 | Zhou et al. | |
| 2008/0080631 A1* | 4/2008 | Forenza et al. | 375/260 |
| 2008/0090575 A1 | 4/2008 | Barak et al. | |
| 2008/0118004 A1* | 5/2008 | Forenza et al. | 375/299 |
| 2008/0130790 A1* | 6/2008 | Forenza et al. | 375/299 |
| 2008/0225823 A1 | 9/2008 | Tenny | |
| 2008/0247375 A1 | 10/2008 | Muharemovic et al. | |
| 2008/0253279 A1* | 10/2008 | Ma et al. | 370/206 |
| 2008/0298306 A1* | 12/2008 | Larsson | 370/328 |
| 2009/0042511 A1 | 2/2009 | Malladi | |
| 2009/0067402 A1* | 3/2009 | Forenza et al. | 370/343 |
| 2009/0073928 A1 | 3/2009 | Power et al. | |
| 2009/0110033 A1* | 4/2009 | Shattil | 375/141 |
| 2009/0196196 A1 | 8/2009 | Ghosh et al. | |
| 2009/0202008 A1 | 8/2009 | Suzuki | |
| 2009/0221297 A1* | 9/2009 | Wengerter et al. | 455/453 |
| 2009/0257381 A1* | 10/2009 | Kuri et al. | 370/329 |
| 2009/0290563 A1 | 11/2009 | Gu et al. | |
| 2009/0304104 A1* | 12/2009 | Le Saux et al. | 375/267 |
| 2010/0008440 A1* | 1/2010 | Lin et al. | 375/267 |
| 2010/0054223 A1* | 3/2010 | Zhang et al. | 370/338 |
| 2010/0061345 A1 | 3/2010 | Wengerter et al. | |
| 2010/0080266 A1* | 4/2010 | Zhang et al. | 375/140 |
| 2010/0080323 A1 | 4/2010 | Mueck et al. | |
| 2010/0110901 A1 | 5/2010 | Wong et al. | |
| 2010/0150281 A1 | 6/2010 | Lee et al. | |
| 2010/0165931 A1* | 7/2010 | Nimbalker et al. | 370/329 |
| 2010/0195566 A1* | 8/2010 | Krishnamurthy et al. | 370/328 |
| 2010/0195614 A1* | 8/2010 | Nimbalker et al. | 370/330 |
| 2012/0201276 A1* | 8/2012 | Zhang et al. | 375/135 |
| 2012/0207192 A1* | 8/2012 | Zhang et al. | 375/135 |
| 2013/0242968 A1* | 9/2013 | Zhang et al. | 370/338 |

* cited by examiner

FIG. 8A

Sector Sweep IE Format

| Bits | 1 | 6 | 6 | 8 | 6 | 5 | 8 | 5 | 3 |
|---|---|---|---|---|---|---|---|---|---|
| | Direction | CDOWN | FWD Sector Select | SNR FB | SLIMIT | L-TX | FBCK-REQ | L-RX | Reserved |

SNR FB ← Estimated Channel Quality and/or Preferred MCS

FIG. 8B

Beam Refinement IE Format

| Bits | 1 | 1 | 5 | 2 | 8 | Variable | 7 |
|---|---|---|---|---|---|---|---|
| | L-TX | L-RX | BS-FBCK | BF-SP-LEN | FBCK-REQ | T-FBCK | Reserved |

T-FBCK ← Estimated Channel Quality and/or Preferred MCS

FIG. 8C

Beamforming Completion IE Format

| Bits | 1 | 1 | Variable | 6 |
|---|---|---|---|---|
| | STA MAC Address | FWD Sector Select | T-FBCK | Reserved |

T-FBCK ← Estimated Channel Quality and/or Preferred MCS

SYSTEMS AND METHODS FOR SELECTING A MODULATION AND CODING SCHEME FOR WIRELESS COMMUNICATION BETWEEN WIRELESS DEVICES IN A WIRELESS NETWORK

CROSS-REFERENCE TO RELATED APPLICATIONS

The present disclosure is a continuation of U.S. patent application Ser. No. 12/716,300 (now U.S. Pat. No. 8,611, 288), filed on Mar. 3, 2010, which claims the benefit of U.S. Provisional Application Nos. 61/176,083, filed on May 6, 2009, 61/170,778, filed Apr. 20, 2009, and 61/157,591, filed Mar. 5, 2009. The entire disclosures of the applications referenced above are incorporated herein by reference.

FIELD

The present disclosure relates to wireless communication systems and more particularly to systems and methods for link adaptation in wireless communication systems.

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

Wireless communication systems may transmit and/or receive data via radio frequency (RF) signals at various frequencies. For example, conventional Wi-Fi communication systems may include less than a 0.5 gigahertz (GHz) spectrum allocated between 2 GHz and 6 GHz (e.g., 2.4 GHz Wi-Fi). This small spectrum may provide for transmission of, for example, up to 300 megabits per second (Mb/s).

60 gigahertz (GHz) wireless communication systems, on the other hand, may include an unlicensed 7 GHz spectrum centered at or near 60 GHz (e.g., 57-64 GHz). The large 7 GHz spectrum may provide for multi-gigabit (Gb) RF links (e.g., >1.0 Gb/s). For example, multi-Gb RF links may allow for transmission of high-definition (HD) media such as HD video.

60 GHz wireless communication systems may also provide more secure transmissions. More specifically, oxygen attenuates high frequency signals (e.g., 57-64 GHz signals), thus limiting the distance of transmissions. In other words, these high frequency signals may rarely be intercepted by other antennas located beyond an intended target antenna.

Moreover, 60 GHz wireless communication systems may include high gain, narrow beam antennas that accurately transmit these short distances to intended target antennas (i.e., unidirectional, as opposed to wide-beam). 60 GHz wireless communication systems, therefore, may include densely distributed antennas that may transmit at the some frequency with minimal interference and increased security. The large number of unidirectional antennas, however, may result in a lack of "channel reciprocity."

Channel reciprocity is based on the property that electromagnetic waves traveling in both directions undergo the same physical perturbations (e.g., reflection, refraction, diffraction, etc.). Thus, when an RF link operates at the same frequency band in both directions, the impulse response of the channel observed between any two antennas may be the same regardless of the direction. Application of the channel reciprocity principle, therefore, may remove the necessity for a continuous feedback of channel estimates.

Two stations in a 60 GHz wireless communication system, however, may include different numbers of antennas. Each station, therefore, may transmit at a different power. Moreover, in addition to oxygen attenuation, transmissions between the stations may be affected by precipitation. For example, the effect of rainfall on 60 GHz transmissions may be greater than the effect of oxygen attenuation. For example only, lower data rates may be required during rainfall to achieve a desired throughput. Therefore, multiple modulation and coding schemes (MCSs) may be required depending on operating conditions. For example, an MCS may include a modulation scheme and/or a data rate.

FIG. 1 illustrates a conventional 60 GHz wireless communication system 10. The 60 GHz wireless communication system may include a first node 12 (Station A, or "$ST_A$") and a second node 14 (Station B, or "$ST_B$") that communicate via RF signals. In other words, Station A 12 may transmit and/or receive RF signals to/from Station B 14. Similarly, Station B 14 may transmit and/or receive RF signals to/from Station A 12.

As previously described, Station A 12 and Station B 14 may include different numbers of antennas. For example only, Station A 12 includes 36 antennas and Station B includes 2 antennas. Station A, therefore, may transmit RF signals at a much higher power than Station B. For channel reciprocity to apply, channel metrics in the forward link direction ($\rho_F$) equal channel metrics in the reverse link direction ($\rho_R$). However, due to different numbers of antennas and thus different MCS and/or data rates that may be used, channel reciprocity may not apply (e.g., $\rho_F \neq \rho_R$) in the example communication system of FIG. 1.

SUMMARY

A system includes a first wireless device and a second wireless device. The first wireless device is configured to determine parameters corresponding to a communication channel and transmit the parameters via the communication channel, wherein the parameters include at least one of (i) an estimated quality of the communication channel or (ii) a modulation and coding scheme (MCS) for transmission via the communication channel. The second wireless device is configured to receive the parameters via the communication channel, and based on at least one of the parameters, select a MCS for transmission to the first wireless device via the communication channel.

In other features, the second wireless device is configured to, based on at least one of the parameters, select a power level for transmission to the first wireless device via the communication channel.

A method includes determining parameters corresponding to a communication channel, transmitting the parameters from a first wireless device to a second wireless device via the communication channel, wherein the parameters include at least one of (i) an estimated quality of the communication channel or (ii) a modulation and coding scheme (MCS) for transmission via the communication channel, receiving the parameters at the second wireless device, and based on at least one of the parameters, selecting a MCS for transmission from the second wireless device to the first wireless device via the communication channel.

In other features, the method includes, based on at least one of the parameters, selecting a power level for transmission from the second wireless device to the first wireless device via the communication channel.

In still other features, the systems and methods described above may be implemented by a computer program executed by one or more processors. The computer program can be tangibly stored or encoded on computer readable medium such as but no limited to memory, volatile or nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIGS. 8A-8C are diagrams of media access control (MAC) layers for sector sweeping, beam refinement, and beamforming completion operations, respectively, according to one implementation of the present disclosure;

DESCRIPTION

Figure 1:
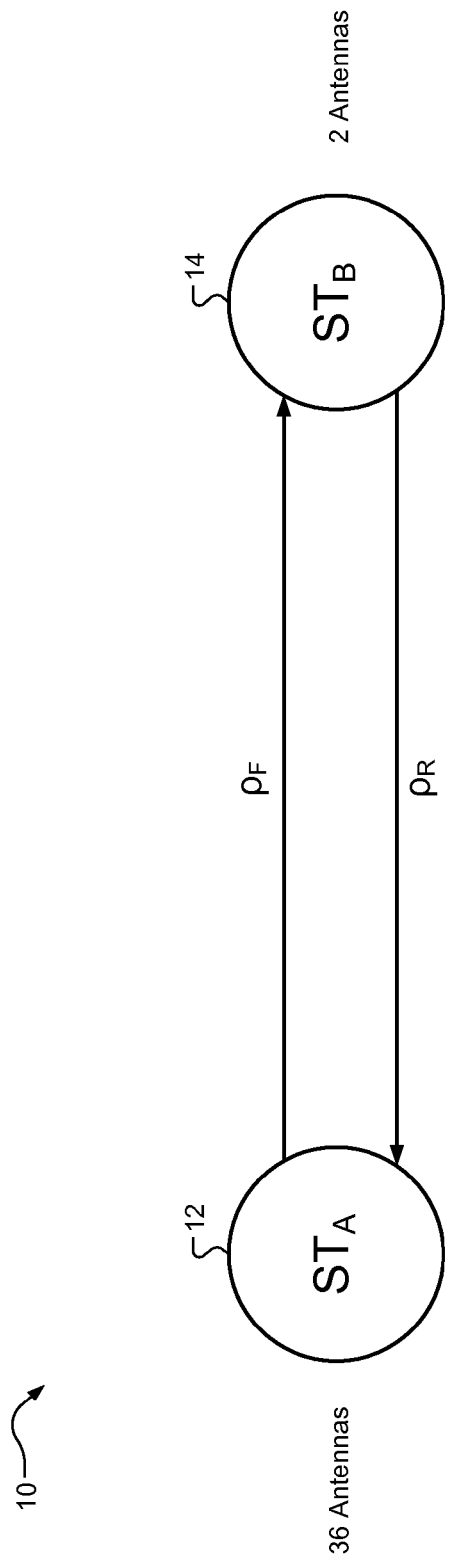
FIG. 1 is a schematic of a wireless communication system according to the prior art.

The following description is merely exemplary in nature and is not intended to limit the disclosure, its application, or uses. For purposes of clarity, the same reference numbers will be used in the drawings to identify similar elements. As used herein, the phrase at least one of A, B, and C should be construed to mean a logical (A or B or C), using a nonexclusive logical OR. In general, one or more steps within a method may be executed in different order (or concurrently) without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 2:
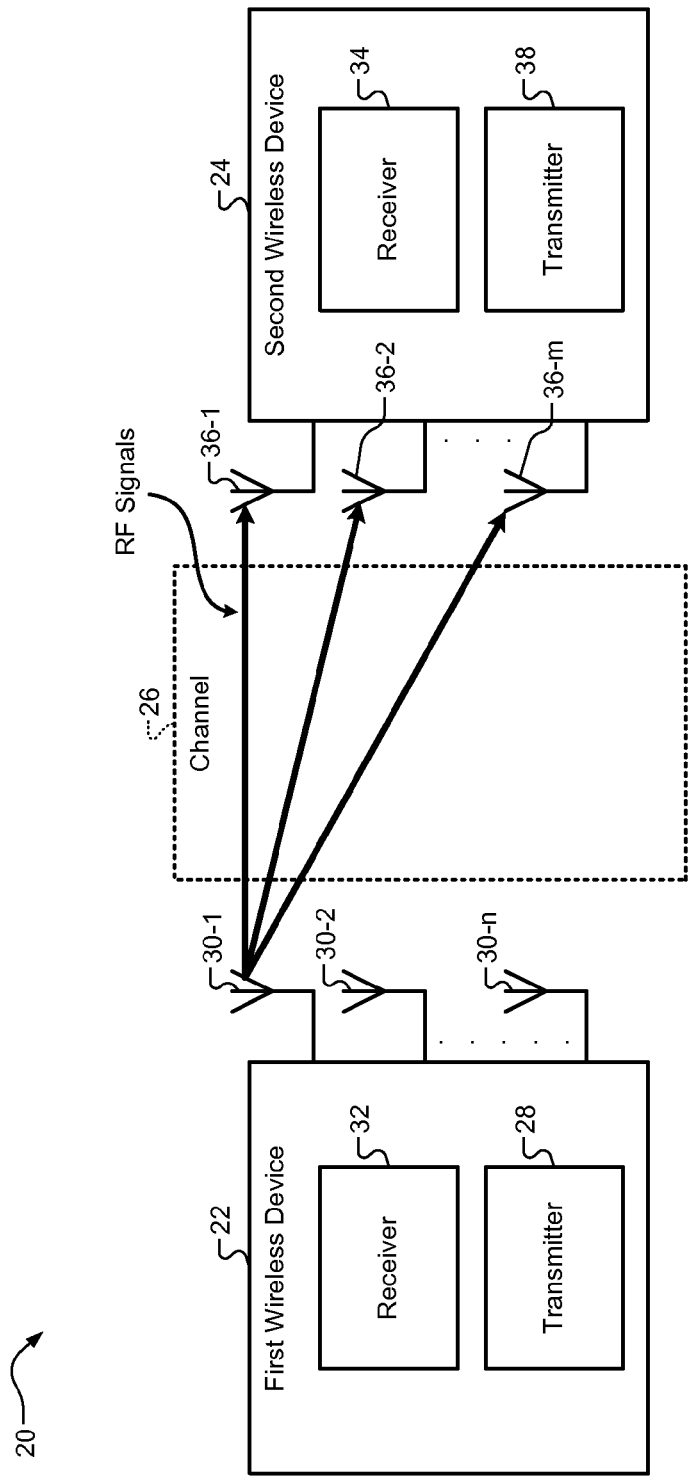
FIG. 2 is a schematic of a 60 gigahertz (GHz) wireless communication system according to one implementation of the present disclosure.

FIG. 2 illustrates a 60 gigahertz (GHz) wireless communication system 20. As previously explained, 60 GHz wireless communication systems may suffer from a lack of channel reciprocity. Accordingly, 60 GHz wireless communication systems may require explicit feedback from a receiver (at a second station) to a transmitter (at a first station). The feedback provides information for adaptation of a radio frequency (RF) link between the first and second stations to improve data throughput.

Conventional 60 GHz wireless communication systems slowly adapt an RF link between two stations based on learned information about a channel between the two stations. For example, conventional 60 GHz wireless communication systems may adjust transmissions based on amount of data lost (i.e., expected throughput minus actual throughput) during a predetermined period. The slow adaptation process, however, may result in decreased throughput prior to adaptation (or optimization) of the RF link.

Therefore, systems and methods are presented that provide for faster adaptation of an RF link in a 60 GHz wireless communication system. For example, the 60 GHz wireless communication system 20 may implement the systems and/or methods of the present disclosure. The systems and methods may improve data throughput of a 60 GHz wireless communication system by determining a modulation and coding scheme (MCS) for transmission. In other words, for example, the systems and methods may determine a modulation scheme and/or a data rate for transmissions to optimize data throughput.

More specifically, the wireless communication system 20 includes a first wireless device 22 that communicates with a second wireless device 24 via a communication channel 26 ("channel 26"). The channel 26 may include a spectrum of RF signals ranging from, for example only, 57-64 GHz. Thus, the channel 26 may be referred to as a "60 GHz channel" due to the spectrum being centered at or near 60 GHz. For example only, the first and second wireless devices 22, 24 may include wireless access points (e.g., a wireless router) and wireless adapters (e.g., a wireless network interface card).

The first wireless device 22 includes a transmitter 28 and a receiver 32. The transmitter 28 transmits RF signals via antennas 30-1, 30-2, . . . , and 30-$n$ (collectively antennas 30). The receiver 32 receives RF signals via the antennas 30. The second wireless device 24 also includes a receiver 34 and a transmitter 38. The receiver 64 receives RF signals via antennas 36-1, 36-2, . . . , and 36-$m$ (collectively antennas 36). The first wireless device 22 can include a different number of antennas relative to the second wireless device 24 (e.g., $n \neq m$). Additionally, for example, the antennas 30, 36 may be high gain, narrow band (or unidirectional) antennas.

The transmitters 28, 38 may transmit data according to an MCS. For example, the MCS can include a modulation scheme and/or a data rate. Thus, the transmitters 28, 38 can encode data streams according to the modulation scheme for transmission via the antennas 30, 36. The antennas 30, 36 can then transmit signals based on the encoded data streams. For example, the modulation scheme may be one of single carrier (SC) modulation and orthogonal frequency-division multiplexing (OFDM) modulation. The transmitters 28, 38 may also control a rate of transmission according to the data rate. For example, the data rate may be one of a plurality of data rates ranging from 1.7 MB/s to 7 Gb/s.

Figure 3:
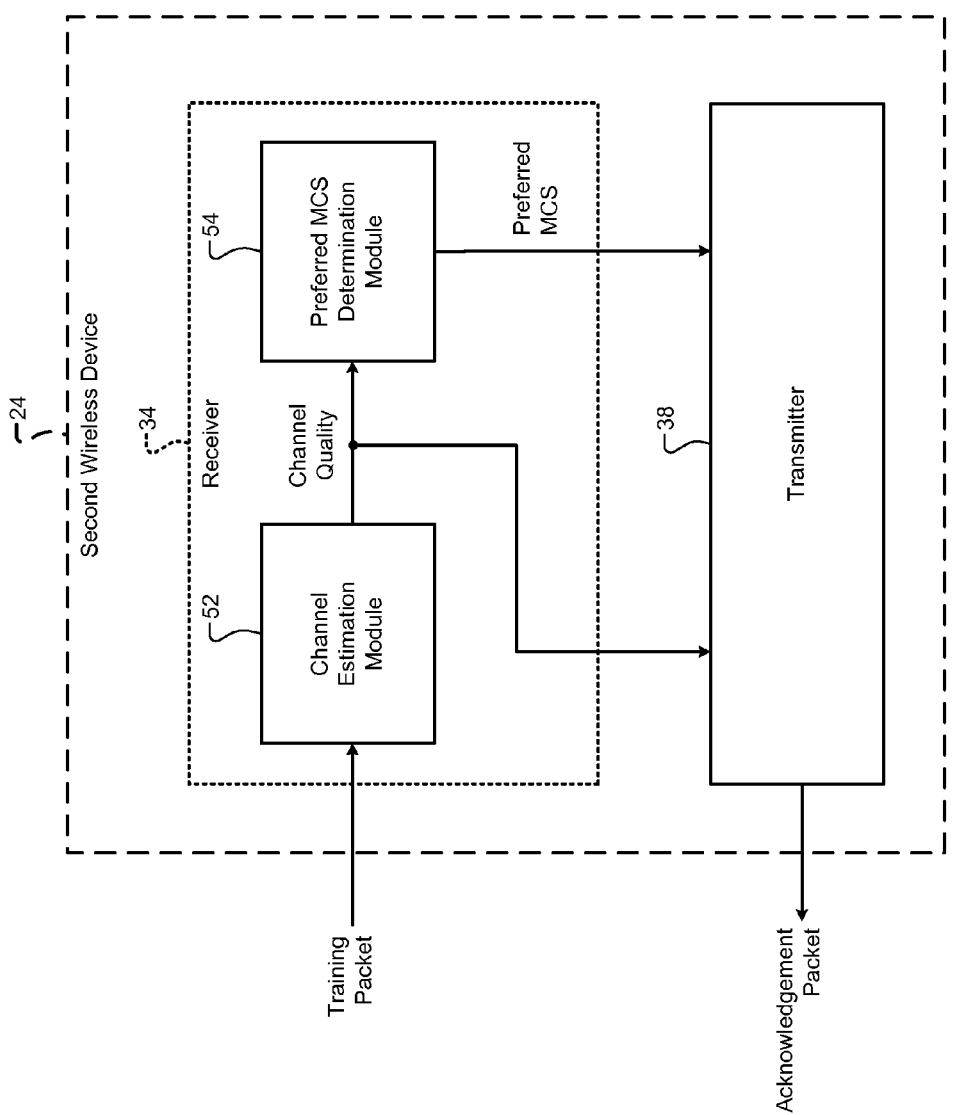
FIG. 3 is a functional block diagram of a wireless device that includes a receiver according to one implementation of the present disclosure.

Referring now to FIG. 3, the second wireless device 24 includes receiver 34 and transmitter 38. The second wireless device 24 may implement the systems and/or methods of the present disclosure. More specifically, receiver 34 includes a channel estimation module 52 that estimates a quality of the channel 26 based on a received training packet (e.g., from transmitter 28 in the first wireless device 22). The estimated quality can include one or more of a plurality of signal strength metrics. The plurality of signal strength metrics can include, but are not limited to a signal-to-noise ratio (SNR) and a receiver signal strength index (RSSI). For example, the SNR may indicate a ratio of a power of an RF signal to a power of noise corrupting the RF signal. For example, the RSSI may indicate a measurement of power present in a received RF signal. In the subsequent descriptions, the term "channel quality" is used to represent one or more than one of the metrics such as SNR, RSSI or other signal quality metrics.

Receiver 34 also includes a preferred MCS determination module 54 that determines a preferred MCS based on the training packet (or the estimated channel quqlity). The preferred MCS can include a preferred modulation scheme and/or a preferred data rate. For example, the preferred modulation scheme may include one that indicates SC modulation (e.g., 0) or OFDM modulation (e.g., 1). Additionally, for example, the preferred data rate may include a data rate ranging from 1.7 MB/s to 7 Gb/s.

The preferred data rate, however, may also depend on the preferred modulation scheme. Therefore, multiple bits may be used to indicate both the preferred modulation scheme and the preferred data rate. For example, multiple bits may indic to various data rates for SC modulation (e.g., $SC_1, SC_2, \ldots, SC_X$) and various data rates for OFDM modulation (e.g., $OFDM_1, OFDM_2, \ldots, OFDM_Y$).

The preferred MCS determination module 54 may also determine the preferred MCS based on other parameters. For example, the other parameters may include channel delay (e.g., average RMS delay). Accordingly, the other parameters may affect the determination of the preferred MCS. Thus, additionally or alternatively, the preferred MCS may include a quantized version of a channel delay profile. Additionally or alternatively, the first wireless device 22 may also include the channel estimation module 52 and the preferred MCS determination module 54 (e.g., in receiver 32).

In one embodiment, receiver 34 selects the MCS to use in subsequent transmissions and then transmits the selection to the first wireless device 22 (via transmitter 38). The process of selecting the MCS, however, may be computationally intensive. The receiver 34, therefore, may require additional processing capabilities (i.e., complexity) in order to properly select the MCS. Moreover, the receiver 34 may not have information regarding power operational amplifiers (PAs) in the transmitter 28, and, thus, the receiver 34 may not accurately select the MCS without knowing how the power of the transmitter 28 may be adjusted.

Therefore, in one implementation, the second wireless device 24 transmits the estimated channel quality and/or the preferred MCS to transmitter 28 (via transmitter 38). More specifically, the receiver 34 can output the estimated channel quality and/or the preferred MCS to the transmitter 38. The transmitter 38 then transmits the estimated channel quality and/or the preferred MCS to the first wireless device 22. For example, the estimated channel quality and/or the preferred MCS may be transmitted as part of an acknowledgement packet or through a special control or management packet or an aggregation of an acknowledgment packet and a special control or management packet. Additionally or alternatively, for example, the feedback may be included in existing feedback packets during beamforming or beam tracking operations. The packet with the estimated channel quality and/or the preferred MCS information may be called link feedback packet in general.

The first wireless device 22 may receive the link feedback packet (via receiver 32) and send the link feedback information (i.e. the estimated channel quality and/or the preferred MCS) to transmitter 28. The transmitter 28 may then perform the MCS selection process. The preferred MCS (in addition to the estimated channel quality) may help the transmitter 28 (in the first wireless device 22) in selecting the MCS to be used in subsequent transmissions. Receiver 34, therefore, may be less complex, thus reducing costs and complexity of the 60 GHz wireless communication system 20.

Figure 4:
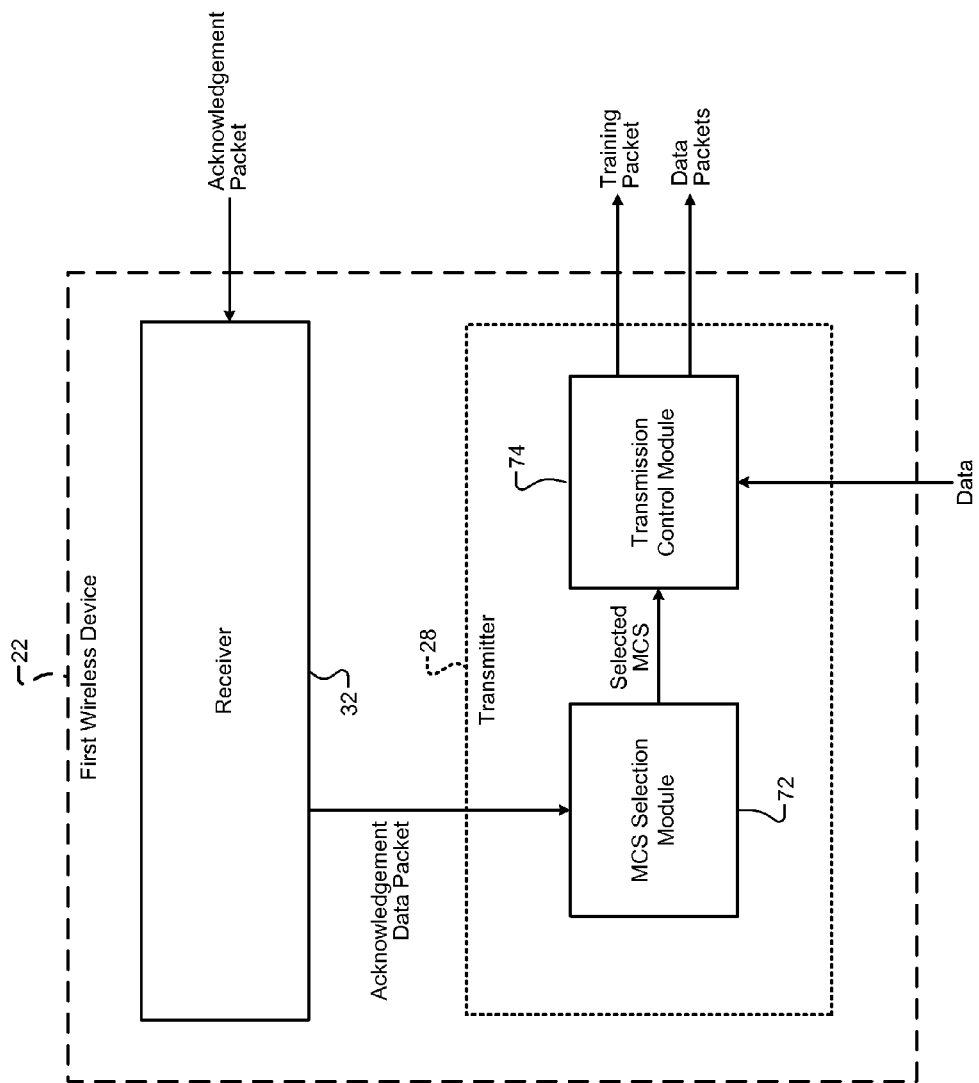
FIG. 4 is a functional block diagram of a wireless device that includes a transmitter according to one implementation of the present disclosure.

Referring now to FIG. 4, the first wireless device 22 includes receiver 32 and transmitter 28. The first wireless device 22 may implement the systems and methods of the present disclosure. More specifically, transmitter 28 may include an MCS selection and power control module 72 that selects the MCS and/or transmit power level to b used in subsequent transmissions based on the estimated channel quality and/or the preferred MCS received from the second wireless device 24. For example, if SNR feedback is very strong, the MCS selection and power control module 72 may determine that a lower transmit power may achieve the same data rate. A transmission control module 74 may then apply the elected MCS and/or transmit power level to subsequent transmissions of data. Additionally or alternatively, the second wireless device 24 may also include the MCS selection and power control module 72 and the transmission control module 74 (e.g., in transmitter 38).

Receiver 32 receives the link feedback packet from transmitter 38 (see FIG. 3). The link feedback packet may include the estimated channel quality and/or th preferred MCS, as determined by the second wireless device 24 (i.e., the receiver 34). The receiver 32 outputs the link feedback information (i.e., the estimated channel quality and/or the preferred MCS) to the MCS selection and power control module 72 of transmitter 28.

The MCS selection and power control module 72 selects the MCS to use in subsequent transmissions based on the estimated channel quality and/or preferred MCS. More specifically, the selected MCS may include a modulation scheme and/or a data rate. For example, the selected MCS may include one of SC modulation and OFDM modulation and/or one of a plurality of data rates (e.g., ranging from 1.7 MB/s to 7 Gb/s).

The transmission control module 74 receives the selected MCS. The transmission control module 74 controls transmission of data according to the selected MCS and/or transmit power level. Specifically, the transmission control module 74 may encode data according to the selected modulation scheme and/or may control transmission of the data according to the selected data rate. Furthermore, for example, transmit power level control may include adjusting the power amplifier (PA) operational level, and/or turning on/off transmit antenna elements. The transmission control module 74 may also control generation and transmission of the training packet. For example, the training packet may be a predetermined packet known by the second wireless device 24.

Figure 5:
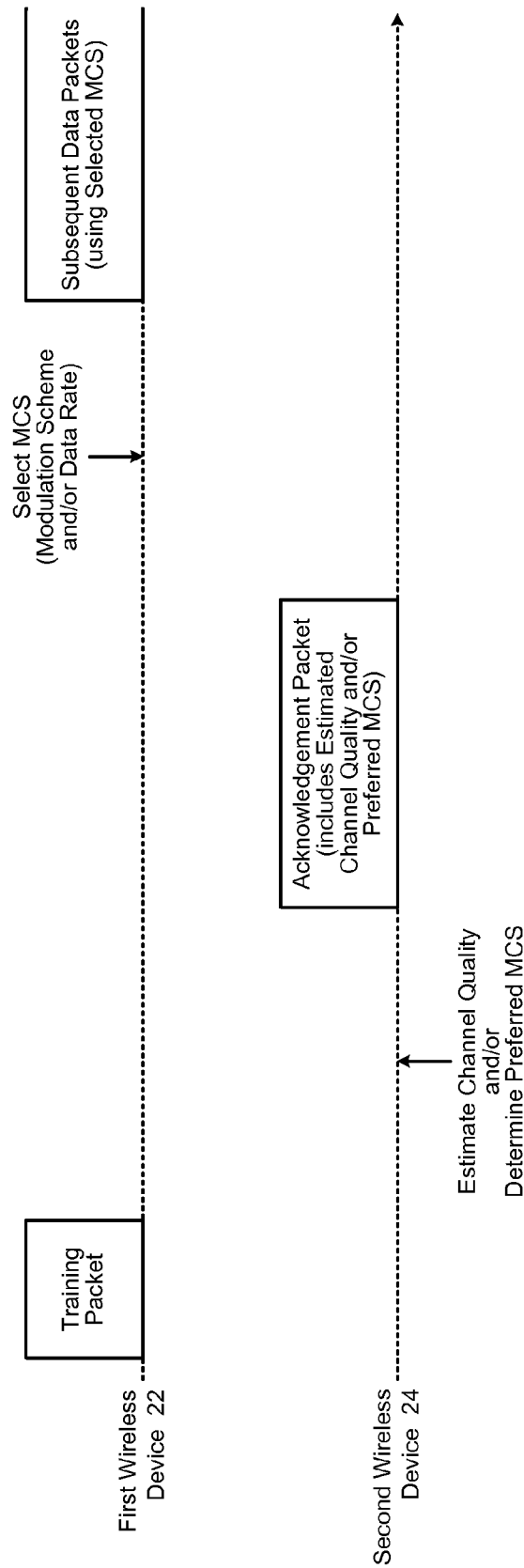
FIG. 5 is a timeline of packet transmissions during link adaptation according to one implementation of the present disclosure.

FIG. 5 illustrates a timeline of a link adaptation. Specifically, link adaptation between the first wireless device 22 and the second wireless device 24 (see FIG. 2) is shown. The link adaptation, however, may be implemented between other wireless devices.

The first wireless device 22 transmits a training packet (via transmitter 28) to the second wireless device 24. The second wireless device 24 receives the training packet (via receiver 34). The second wireless device 24 then estimates a channel quality using the training packet. More specifically, for example, the training packet may be a predetermined packet known by the second wireless device 24. Thus, the second wireless device 24 may estimate channel quality based on a quality of the received training packet.

Additionally or alternatively, the second wireless device 24 may determine a preferred MCS. For example, the preferred MCS may include a preferred modulation scheme (e.g., SC or OFDM) and/or a preferred data rate (e.g., 1.7 MB/s to 7 Gb/s). For example only, the preferred MCS may include one bit indicating the preferred modulation scheme (e.g. 0 for SC modulation and 1 for OFDM modulation). Alternatively, for example only, the preferred MCS may include multiple bits indicating the preferred modulation scheme and the preferred data rate (e.g., $SC_1$, $SC_2$, ..., $SC_X$, $OFDM_1$, $OFDM_2$, ..., $OFDM_Y$).

The second wireless device 24 may then transmit an acknowledgment packet or any other packet (via transmitter 38) back to the first wireless device 22. More specifically, this packet may include the estimated channel quality and/or the preferred MCS. The first wireless device 22 may receive the acknowledgement packet (via receiver 32).

The first wireless device 22 may then select an MCS and/or transmit power level based on the acknowledgement packet. More specifically, the first wireless device 22 may select the MCS based on the estimated channel quality and/or the preferred MCS, add/or may select the transmit power level based on the estimated channel quality. After selecting the MCS and/or transmit power level, the first wireless device 22 may begin transmitting data packets according to the selected MCS. In other words, the first wireless device 22 may encode data using the selected modulation scheme and/or transmit data according to the selected data rate.

Figure 6:
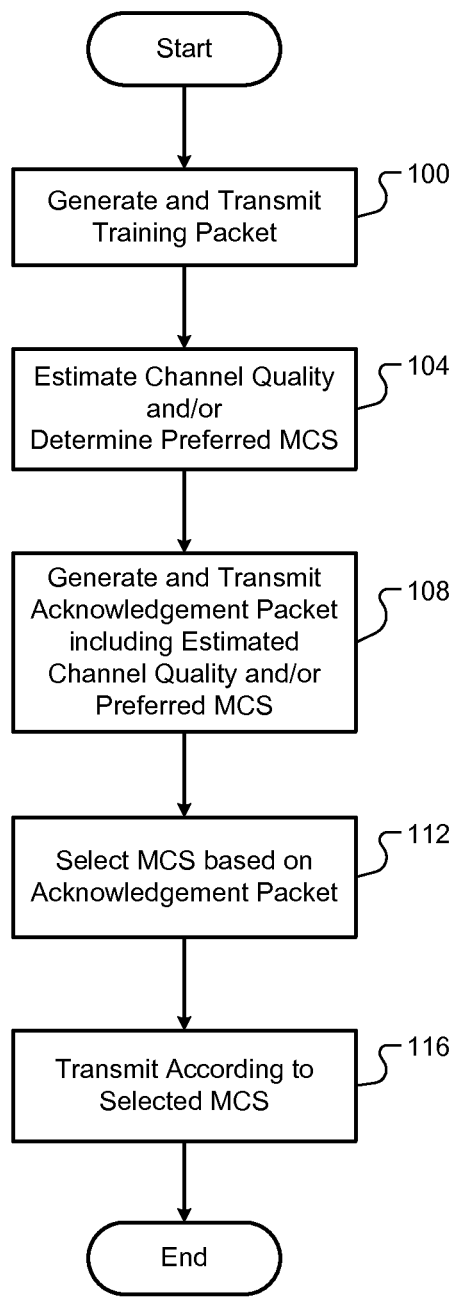
FIG. 6 is a flow diagram of a method for link adaptation according to one implementation of the present disclosure.

Referring now to FIG. 6, a method for adapting an RF link in a 60 GHz wireless communication system begins at 100. At 100, the first wireless device 22 generates and transmits a training packet. At 104, the second wireless device 24 receives the training packet and estimates channel quality and/or determines a preferred MCS based on the training packet. While the first and second wireless devices 22, 24 are described, the method may be implemented using other wireless devices.

At 108, the second wireless device 24 generates and transmits n acknowledgement packet that includes the estimated channel quality and/or the preferred MCS. At 112, the first wireless device 22 receives the acknowledgement packet and selects an MCS and/or transmit power level based on the acknowledgement packet. At 116, the first wireless device 22 may transmit according to the selected MCS and/or transmit power level. In other words, the first wireless device 22 may encode data according to the selected modulation scheme and/or transmit the data according to the selected data rate, and/or transmit with the selected power level.

Referring again to FIG. 2, noise in the channel 26, such as electromagnetic interference (EMI), inter-channel crosstalk, etc., may interfere with the signals transmitted through the channel 26. Thus, transmitters 28, 38 may use a technique called beamforming to reduce the effects of noise on signals transmitted through the channel 26. Beamforming may increase SNR of signals received at receivers 32, 34. Consequently, beamforming may a low the transmitters 28, 38 to increase data rates during transmission. Moreover, beamforming may be required in 60 GHz wireless communication systems due to the high gain, narrow be m antennas that are typically implemented.

During a beamforming operation, the transmitters 28, 38 may nap data streams to antennas 30, 36, respectively, to change a spatial gain of transmitted signals. Mapping the data streams to the antennas 30, 36 to change the spatial gain of transmitted signals is referred to herein as "steering a signal." The transmitters 28, 38 may map a data stream to the antennas 30, 36, respectively, using complex weighting values. Each of the complex weighting values may include an amplitude portion and a phase shift portion. The complex weighting values used to map the data stream to the antennas 30, 36 may be included in a steering matrix. Accordingly, the transmitters 28, 38 may map the data stream to the antennas 30, 36, respectively, based on the steering matrix.

For example, a beamforming operation may be further divided into three stages: sector sweeping, beam refinement, and beamforming completion. Sector sweeping includes each transmitter (i.e., each wireless device) determining a best sector (i.e., direction) for transmission based on feedback from receivers (i.e., other wireless device) in different sectors. Beam refinement, on the other hand, includes an iterative loop of transmitting training packets and adjusting the steering matrix based on feedback from a wireless device in the best sector. Accordingly, in one implementation, beam refinement includes continually adjusting (or steering) signals to various antennas to improve an overall quality of transmission. Lastly, beamforming completion includes transmitting and feeding back a final feedback packet, after which normal transmission of data packets may begin.

Figure 7:
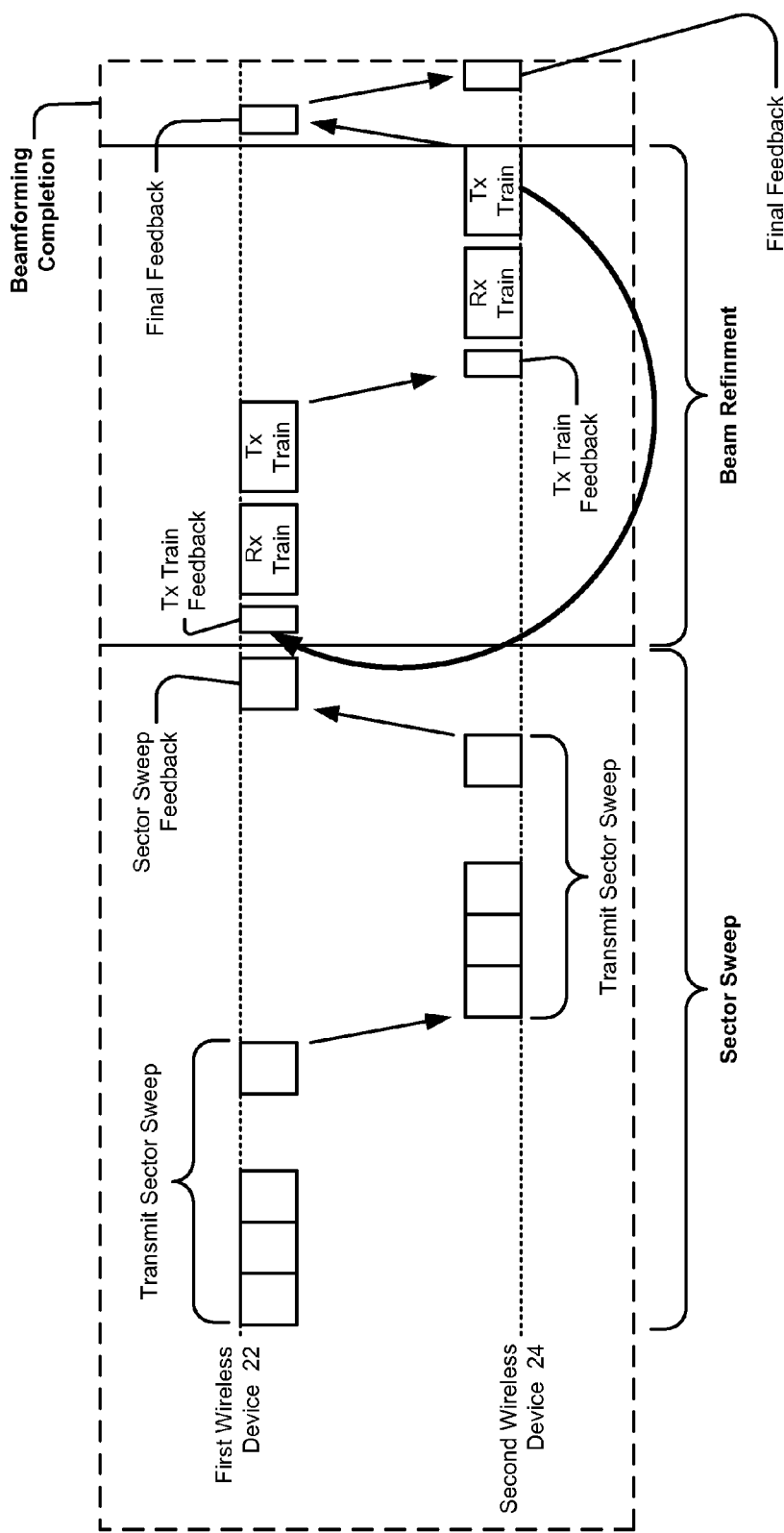
FIG. 7 is a schematic of a beamforming operation according to ore implementation of the present disclosure.

FIG. 7 illustrates a beamforming operation that includes the link adaptation of the present disclosure. For example, a beamforming operation between the first wireless device 22 and the second wireless device 24 (see FIG. 2) is shown. The beamforming operation, however, may be implemented between other wireless devices.

The beamforming operation begins with a sector sweep operation. More specifically, the first wireless device 22 may transmit to different sectors and determine a best sector based on feedback from wireless devices in the different sectors. As shown, or example, the first wireless device 22 transmits to a sector that includes the second wireless device 24.

The second wireless device 24 transmits feedback to the first wireless device 22. The feedback may also include estimated channel quality and/or a preferred CS according to the link adaptation of the present disclosure. The first wireless device 22 may determine, for example, that the second wireless device 24 is located in a best sector.

The beamforming operation may continue with a beam refinement operation between the first wireless device 22 and the second wireless device 24 (i.e., on top of the best sector). The beam refinement operation may include an iterative process of transmitting receive training packets (Rx Train), which includes a receive training sequence (TRN-R) at the end of the packet, and transmitting transmit training packets (Tx Train), which includes a transmit training sequence (TRN-T) at the end of the packet, and refining (i.e., steering) the beam based on feedback with respect to TRN-T. More specifically, for example, the first wireless device 22 may transmit training packets to the second wireless device 24.

The second wireless device 24 may transmit feedback to the first wireless device 22, such as channel strength information (CSI) or a steering matrix. The feedback may also include estimated channel quality and/or a preferred MCS according to the link adaptation of the present disclosure. For example, the channel quality may include the channel quality (e.g. SNR) corresponding to each subsequence of the transmit training sequence TRN-T. The first wireless device 22 may then adjust (i.e., steer) the transmit beam based on th received feedback, meanwhile the first wireless device 22 may adjust its MCS and/or transmit power level for the subsequent transmitted packets, based on the channel quality and/or MC feedback. The same process above then may be conducted on the reverse direction. In other words, the second wireless device 24 starts to transmit receive training packets Rx Train and transmit training packets Tx Train to first wireless device 22, which follows the same feedback and MCS and/or transmit power selection procedure as described above. The process of transmitting training packets and adjusting the beam based on feedback may continue until the beam is refined. For example, the beam may be refined when the feedback indicates transmission quality is greater than a quality threshold. In each iteration the MCS and/or transmit power of the Rx Train or Tx Train packets from first wireless device 22 to second device 24, or on the reverse direction, may be adjusted based on the channel quality and/or MCS feedback in the previous iteration, as described above.

The beamforming operation may conclude with a beamforming completion operation between the first wireless device 22 and the second wireless device 24. The beamforming completion operation may include transmitting a final feedback packet in both directions. For example, transmitting and feeding back a final packet may verify beam refinement. In other words, the first wireless device 22 may transmit the final packet to the second wireless device 24. The second wireless device 24 may receive the final packet and transmit a final feedback packet back to the first wireless device 22. The final feedback packets in both directions may include the estimated channel quality and/or preferred MCS according to the link adaptation of the present disclosure.

After the completion of the beamforming operation, the first wireless device 22 and second wireless device 24 may then select an MCS and/or transmit power level for subsequent transmissions in both directions, respectively, based on the received channel quality feedback and/or MCS feedback during the beam refinement iteration(s). In other words, in both directions, respectively, the first wireless device 22 and second wireless device 24 may encode the data according to the selected modulation scheme and/or transmit the data according to the selected data rate and transmit using the selected transmit power.

Referring now to FIGS. 8A-8C, media access control (MAC) layer packet format for sector sweeping, beam refining, and beamforming completion operations are shown. These formats, however, are examples, and thus other subfields of FIGS. 8A-8C may be varied according to applications; however, the proposed subfields for similar concepts may be fixed in whatever format to be applied. FIG. 8A illustrates an example of the corresponding portion of MAC layer format in a packet for a sector sweeping operation. The estimated channel quality and/or preferred MCS may be included in an SNR feedback field ("SNR-FB") which has a length of 8 bits. FIG. 8B illustrates an example of the corresponding portion of MAC layer format in a packet for a beam refinement operation. The estimated channel quality a d/or preferred MCS may be included in a transmission feedback field ("T-FBCK") which has variable bit length. FIG. 8C illustrates an example of the corresponding portion of MAC layer format in a packet for a beamforming completion operation. The estimated channel quality and/or preferred MCS may be included in a transmission feedback field ("T-FBCK") which has a variable bit length (similar to FIG. 8B).

Figure 9:
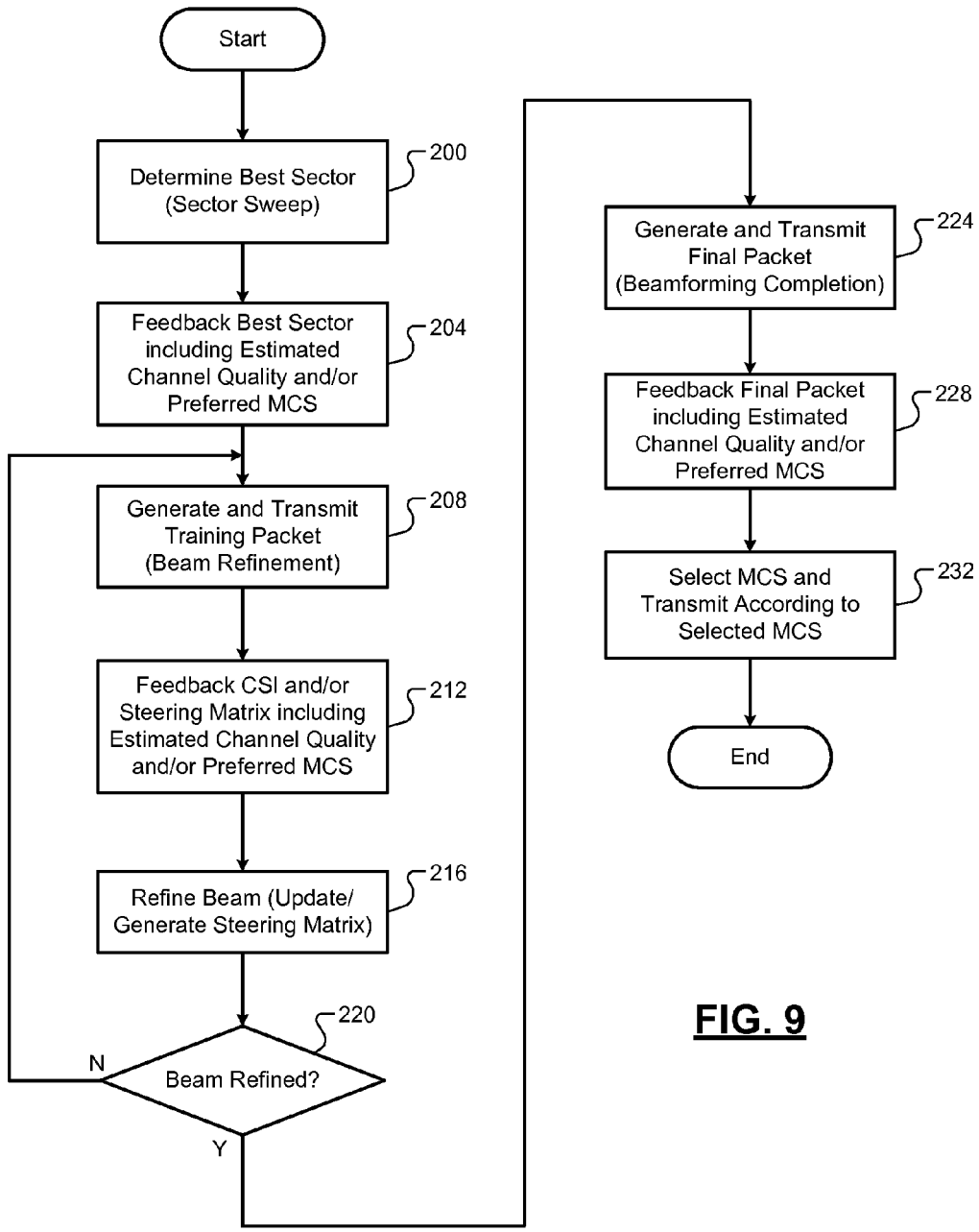
FIG. 9 is a flow diagram of a method for link adaptation during beamforming operations according to one implementation of the present disclosure.

Referring now to FIG. 9, a method for link adaptation during beamforming operations begins at 200. At 200, the first wireless device 22 performs a sector sweep operation to determine a best sector for transmission. At 204, the second wireless device 24 responds to the sector sweep by feeding back a sector index indicating the best sector. For exemplary purposes the second wireless device 24 may be located in the best sector. The second wireless device 24 may also include an estimated channel quality and/or a preferred MCS in the best sector index feedback to the first wireless device 22. While the first and second wireless devices 22, 24 are described, the method may be implemented using other wireless devices.

At 208, the first wireless device 22 may begin a beam refinement operation. More specifically, the first wireless device 22 may generate and transmit training packets to the second wireless device 24. At 212, the second wireless device 24 may feedback CSI and/or a steering matrix to the first wireless device 22. The second wireless device 24 may also feedback an estimated channel quality and/or a preferred MCS to the first wireless device 22.

At 216, the first wireless device 22 may refine the beam using th CSI and/or steering matrix received from the second wireless device 24. For example, the first wireless device 22 may adjust an existing steering matrix or generate a new steering matrix based on the received CSI and/or steering matrix. Meanwhile the first wireless device 22 may select appropriate MCS and/or transmit power level for the subsequent packets transmitted from itself to the second device 24 (e.g. another iteration of training packets). At 220, the first wireless device 22 determines whether the beam is refined. For example, the first wireless device 22 may determine that the beam is refined when a quality of transmission (via feedback from the second wireless device 24) is greater than a quality threshold. If true, control may proceed to 224. If false, control may return to 208 and beam refinement may continue. The same process from 208 to 220 may be conducted one more time in the reverse direction (i.e. from second wireless device 24 to first wireless device 22) in each of the beam refinement iterations (i.e. in each iteration forward and reverse training process are both conducted).

At 224, the first wireless device 22 and second wireless device 24 may conclude the beamforming operation with a beamforming completion operation in both directions, respectively. More specifically, the first wireless device 22 and second wireless device 24 may transmit a final feedback packet to the second wireless device 24. At 228 the second wireless device 24 may receive the final feedback packet and send the final feedback packet on the reverse direction. In both of the final feedback packets, the first wireless device 22 and the second wireless device 24 may include an estimated channel quality and/or preferred MCS in the final feedback packets in both directions respectively.

At 232, the first wireless device 22 and the second wireless device 24 may select an MCS and/or transmit power level for subsequent transmissions based on the received transmit training feedback and/or final feedback packets in both directions during the whole beam refinement iterations. More specifically, the first wireless device 22 and second wireless device 24 may select the MCS and/or transmit power level based on the estimated channel qualities and/or the preferred MCSs received. For example, the first wireless device 22 and second wireless device 24 may select an MCS and/or transmit power level based on averages of the estimated channel qualities and/or a most preferred MCS in some or all of the transmit training feedback packets during the iterations (in both directions). Alternatively, for example, the first wireless device 22 and second wireless device 24 may select an MCS based on a most recent estimated channel quality and/or preferred MCS (e.g., the final feedback packets). The first wireless device 22 and second wireless device 24 may then encode data according to the selected modulation scheme and/or transmit data according to the selected data rate, and transmit using the selected transmit power.

Figure 10:
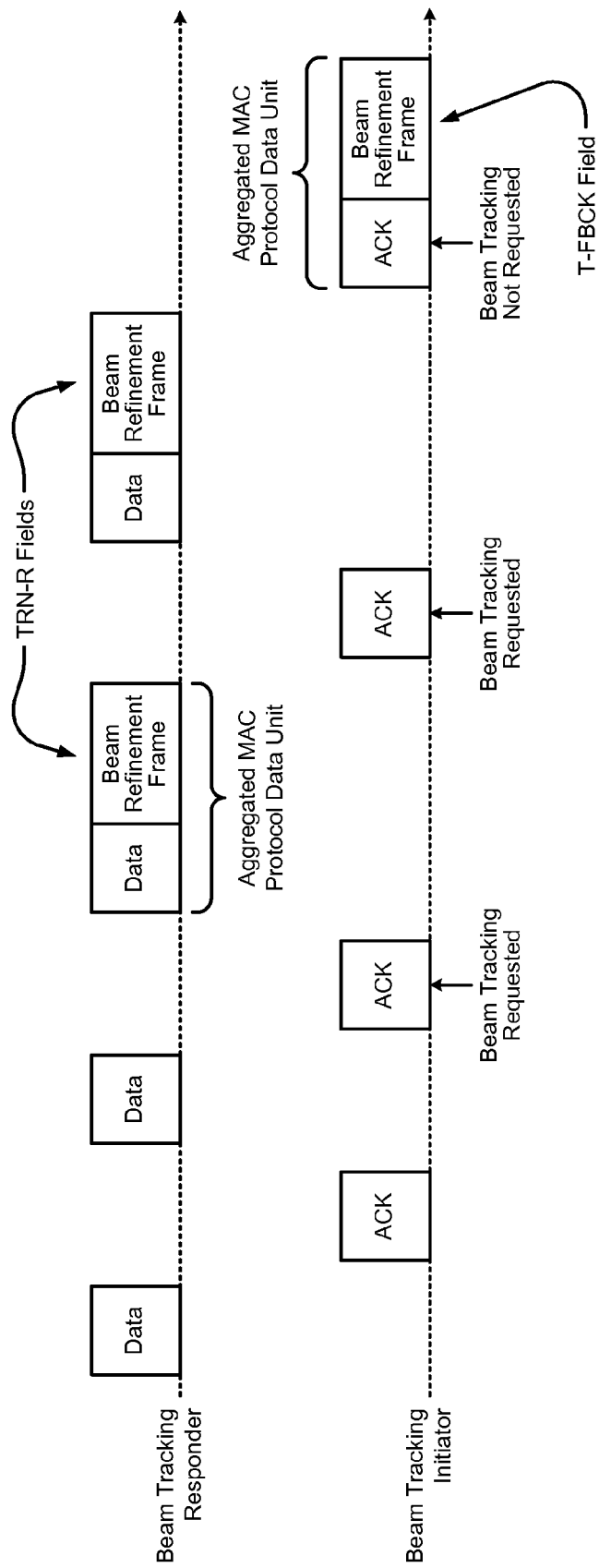
FIG. 10 is a timeline of packet transmissions during a beam tracking operation according to one implementation of the present disclosure.

Referring now to FIG. 10, a timeline of a link adaptation during a beam tracking operation is shown. Beam tracking refers to a beam refinement operation triggered after an initial beamforming operation. In other words, data throughput may decrease when a channel changes and thus a beam tracking operation may be required to refine the beam and increase data throughput. For example, beam tracking may occur during normal operation of the system by aggregating beam refinement information onto existing data and/or acknowledgement packets.

A wireless device that initiates a beam tracking operation may be referred to as a "beam tracking initiator." A wireless device that responds to a beam tracking operation may be referred to as a "beam tracking responder." For example, the beam tracking initiator and the beam tracking responder may include the first and second wireless devices 22, 24.

The beam tracking initiator may initiate a beam tracking operation via an acknowledgement packet that includes a beam tracking request. The acknowledgment packet may then be transmitted to the beam tracking responder. For example, the beam tracking initiator may initiate beam tracking when a quality of transmission decreases below a threshold. The beam tracking responder may receive the acknowledgement packet and begin beam tracking when the acknowledgement packet includes a beam tracking request.

The beam tracking responder may aggregate beam refinement frame onto a data packet for transmission to the beam tracking initiator. For example, the aggregated information for transmission may be referred to as an aggregated MAC protocol data unit, or AMPDU. Additionally, a receive training sequence TRN-R is appended at the end of the same AMPDU packet, so on receiving this AMPDU packet, the beamtracking initiator will be able to refine its receive antenna array. For example, TRN-R may include a known training sequence for the purpose of receive antenna array training, and thus no feedback for TRN-R is required.

Subsequently, the beam tracking initiator may request another beam tracking request for transmit training, then the beam tracking responder, on receiving the second tracking request, may send another aggregate data and beam refinement frame with a TRN-T sequence appended at the end of the packet. To respond the TRN-T, after receiving the AMPDU packet, the beam tracking initiator may transmit another A-MPDU with a beam refinement frame to the beam tracking responder, in which the estimated CSI/steering matrix are contained, and in addition channel quality and/or a preferred MCS may be included in the transmission feedback ("T-FBCK") field of the beam refinement frame in the same A-MPDU. And then the beam tracking responder on receiving the feedback may adjust its transmit beam based on the CSI/steering matrix feedback. In addition, the beam tracking responder may select appropriate MCS and/or transmit power level for the subsequent transmissions. The beam tracking initiator may continue requesting beam tracking until transmission quality increases (e.g., above a threshold). The same beam tracking process may be conducted in the reverse direction, i.e. initiated by the original beam tracking responder, therefore the original beam tracking initiate is also able to receive channel quality and/or MCS feedbacks and adjust its own MCS and/or transmit power accordingly.

Figure 11:
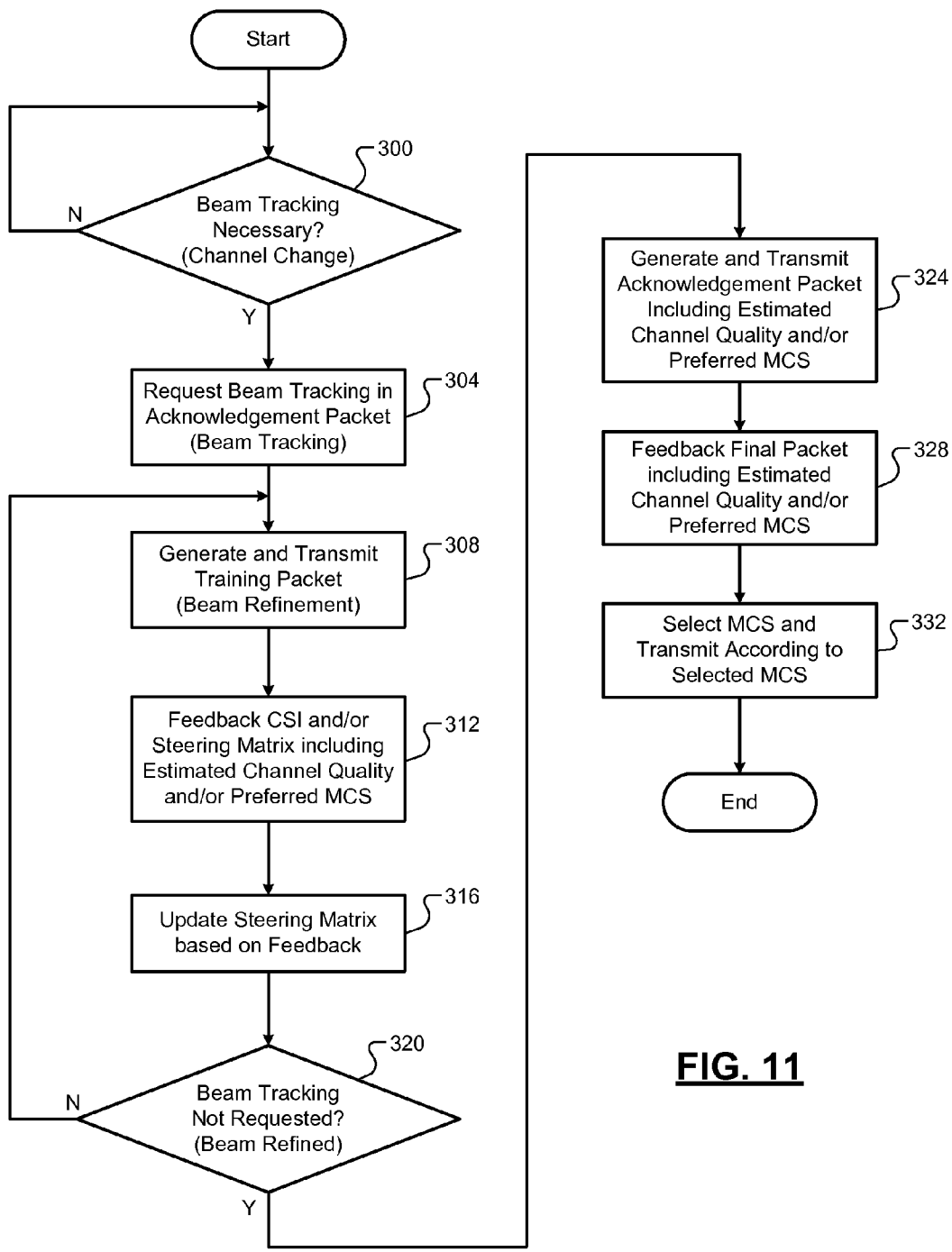
FIG. 11 is a flow diagram of a method for link adaptation during beam tracking operations according to one implementation of the present disclosure.

Referring now to FIG. 11, a method for adapting an RF link during a beam tracking operation begins at 300. At 300, the beam tracking initiator may determine whether a beam tracking operation is necessary (i.e., whether the channel has changed). If true, control may proceed to 304. If false, control may return to 300.

At 304, the beam tracking initiator generates an acknowledgement packet that includes a beam tracking request. The beam tracking initiator may then transmit the acknowledgement packet to the beam tracking responder. At 308, the beam tracking responder receives the acknowledgement packet. The beam tracking responder may generate and transmit an AMPDU that includes a bean refinement (BR) frame with appended TRN-R fields. More specifically, the beam tracking responder may aggregate the receive training information onto an existing data packet for transmission.

At 312, the beam tracking initiator may receive the aggregated packet with the receive training information. For example, the receive training information may be a known sequence in the appended TRN-R field(s). The beam tracking responder may then refine the receive antenna array based on.

At 316, the beam tracking responder may determine whether the beam tracking initiator is requesting beam tracking. More specifically, the beam tracking initiator may be requesting transmit training. If true, control may proceed to 320. If false, control may return to 316.

At 320, the beam tracking responder may generate an AMPDU that includes a BR frame with appended TRN-T fields. More specifically, the beam tracking responder may aggregate the transmit training information onto an existing data packet for transmission.

At 324, the beam tracking initiator may receive the aggregated packet with the transmit training information. For example, the transmit training information may include information in the appended TRN-T field(s). For example, the information may include CSI and/or a steering matrix. The beam tracking initiator may then refine the transmit beam based on the information.

At 328, the beam tracking initiator may determine whether beam tracking should be requested again. For example, the beam tracking initiator may determine that beam tracking is no longer required when transmission quality increases above a threshold. If true, control may return to 308. If false, control may proceed to 332.

At 332, the beam tracking initiator may generate and transmit an AMPDU that includes a BR frame with feedback information (T-FBCK). For example, the feedback information may include estimated channel quality (e.g., SNR, RSSI, etc.) and/or a preferred MCS.

At 336, the beam tracking responder may select an MCS and/or a transmit power level based on the feedback information. The beam tracking responder may then encode data according to the selected modulation scheme and/or transmit data according to the selected data rate and/or the selected transmit power level.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A first wireless device, comprising:
   a receiver comprising
      a channel estimation module configured to (i) receive, from a second wireless device over a communication channel, a training packet, and (ii) estimate a quality of the communication channel based on the training packet, and
      a modulation and coding scheme (MCS) determination module configured to determine an MCS based on one or more of (i) the training packet and (ii) the estimated quality of the communication channel; and a transmitter configured to transmit, to the second wireless device over the communication channel, an indication of the MCS determined by the MCS determination module.

2. The first wireless device of claim 1, wherein the estimated quality of the communication channel includes one or more of a signal-to-noise ratio and a receiver signal strength index, and wherein the receiver signal strength index corresponds to a measurement of power present in a received signal.

3. The first wireless device of claim 1, wherein the determined MCS includes a preferred data rate.

4. The first wireless device of claim 1, wherein the determined MCS includes an indication of one of single carrier modulation or orthogonal frequency division multiplexing modulation.

5. The first wireless device of claim 1, wherein the determined MCS includes multiple bits indicating (i) one of single carrier modulation or orthogonal frequency division multiplexing modulation, and (ii) one of a plurality of data rates.

6. The first wireless device of claim 1, wherein the determined MCS includes a channel delay profile.

7. The first wireless device of claim 1, wherein the transmitter is configured to transmit, to the second wireless device over the communication channel, an acknowledgment packet in response to the training packet, and wherein the acknowledgment packet includes the indication of the determined MCS.

8. A system, comprising:
the first wireless device of claim 1; and
the second wireless device, wherein
the second wireless device is configured to select an MCS based on the indication of the determined MCS received from the transmitter of the first wireless device.

9. The first wireless device of claim 1, wherein the communication channel includes a radio frequency spectrum ranging from 57 gigahertz (GHz) to 64 GHz.

10. The first wireless device of claim 1, wherein the transmitter is configured to transmit the indication of the determined MCS to the second wireless device during a beamforming operation or a beam tracking operation.

11. A method of operating a first wireless device, the method comprising:
at the first wireless device,
receiving, from a second wireless device over a communication channel, a training packet,
estimating a quality of the communication channel based on the training packet,
determining a preferred MCS based on one or more of (i) the training packet and (ii) the estimated quality of the communication channel, and
transmitting, from the first wireless device to the second wireless device over the communication channel, an indication of the MCS determined by the first wireless device.

12. The method of claim 11, wherein the estimated quality of the communication channel includes one or more of a signal-to-noise ratio and a receiver signal strength index, and wherein the receiver signal strength index corresponds to a measurement of power present in a received signal.

13. The method of claim 11, wherein the determined MCS includes a preferred data rate.

14. The method of claim 11, wherein the determined MCS includes an indication of one of single carrier modulation or orthogonal frequency division multiplexing modulation.

15. The method of claim 11, wherein the determined MCS includes multiple bits indicating (i) one of single carrier modulation or orthogonal frequency division multiplexing modulation, and (ii) one of a plurality of data rates.

16. The method of claim 11, wherein the determined MCS includes a channel delay profile.

17. The method of claim 11, wherein transmitting the indication of the determined MCS includes transmitting an acknowledgment packet in response to the training packet, and wherein the acknowledgment packet includes the indication of the determined MCS.

18. The method of claim 11, further comprising:
at the second wireless device, selecting an MCS based on the indication of the determined MCS received from the first wireless device.

19. The first wireless device of claim 11, wherein the communication channel includes a radio frequency spectrum ranging from 57 gigahertz (GHz) to 64 GHz.

20. The first wireless device of claim 11, wherein transmitting the indication of the determined MCS includes transmitting the indication of the determined MCS to the second wireless device during a beamforming operation or a beam tracking operation.

* * * * *